US008868095B2

(12) United States Patent
Smith et al.

(10) Patent No.: US 8,868,095 B2
(45) Date of Patent: *Oct. 21, 2014

(54) DOWNLINK AND UPLINK ARRAY AND BEAMFORMING ARRANGEMENT FOR WIRELESS COMMUNICATION NETWORKS

(71) Applicant: Apple, Inc., Cupertino, CA (US)

(72) Inventors: Martin Stevens Smith, Chelmsford (GB); Andrew James Urquhart, Bishops Stortford (GB); Julius George Robson, Sandown (GB); David Damian Nicholas Bevan, Bishops Stortford (GB)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/780,393

(22) Filed: Feb. 28, 2013

(65) Prior Publication Data
US 2013/0178223 A1    Jul. 11, 2013

Related U.S. Application Data

(63) Continuation of application No. 12/857,622, filed on Aug. 17, 2010, now Pat. No. 8,406,812, which is a continuation of application No. 10/358,914, filed on Feb. 5, 2003, now Pat. No. 7,792,547.

(51) Int. Cl.
*H04W 72/04* (2009.01)

(52) U.S. Cl.
USPC ........ 455/452.1; 455/450; 455/525; 455/561; 455/562.1; 455/101

(58) Field of Classification Search
USPC ............ 455/452.1, 561, 562.1, 525, 101, 450
See application file for complete search history.

(56) References Cited

U.S. PATENT DOCUMENTS

| | | |
|---|---|---|
| 5,565,873 A | 10/1996 | Dean |
| 6,016,123 A | 1/2000 | Barton |
| 6,094,165 A | 7/2000 | Smith |
| 6,275,484 B1 | 8/2001 | Lynch et al. |
| 6,480,524 B1 | 11/2002 | Smith et al. |
| 6,697,643 B1 | 2/2004 | Hagerman et al. |
| 6,801,790 B2 | 10/2004 | Rudrapatna |
| 6,850,741 B2 | 2/2005 | Lei et al. |
| 6,870,515 B2 | 3/2005 | Kitchener et al. |
| 7,039,441 B1 | 5/2006 | Reudink et al. |
| 7,058,367 B1 | 6/2006 | Luo et al. |
| 7,079,083 B2 | 7/2006 | Gottl et al. |
| 7,248,841 B2 | 7/2007 | Agee et al. |
| 7,289,826 B1 | 10/2007 | Hovers et al. |
| 2002/0080073 A1 | 6/2002 | Wastberg |
| 2002/0085643 A1 | 7/2002 | Kitchener et al. |
| 2003/0139198 A1 | 7/2003 | Johannisson et al. |
| 2003/0190897 A1 | 10/2003 | Lei et al. |
| 2004/0204111 A1 | 10/2004 | Ylitalo |

*Primary Examiner* — Michael T Vu
(74) *Attorney, Agent, or Firm* — Meyertons, Hood, Kivlin, Kowert & Goetzel, P.C.

(57) ABSTRACT

System and methods of cellular communications network are described herein. In one system, an antenna array is described. The antenna array has a first beamforming arrangement for producing uplink beams and a second beamforming arrangement for producing downlink beams. The first and second beamforming arrangements are different from one another. The wireless communication network communicates with a mobile station by use of the uplink and downlink beamforming arrangements.

17 Claims, 5 Drawing Sheets

DOWNLINK AND UPLINK ARRAY AND BEAMFORMING ARRANGEMENT FOR WIRELESS COMMUNICATION NETWORKS

PRIORITY CLAIM

This application is a continuation of U.S. patent application Ser. No. 12/857,622 entitled "DOWNLINK AND UPLINK ARRAY AND BEAMFORMING ARRANGEMENT FOR WIRELESS COMMUNICATION NETWORKS" to Smith et al., filed Aug. 17, 2010, which is a continuation of U.S. patent application Ser. No. 10/358,914 entitled "DOWNLINK AND UPLINK ARRAY AND BEAMFORMING ARRANGEMENT FOR WIRELESS COMMUNICATION NETWORKS" to Smith et al., filed Feb. 5, 2003, now U.S. Pat. No. 7,792,547, all of which are incorporated herein by reference in their entirety.

FIELD OF THE INVENTION

This invention relates to an antenna array and beamforming arrangement for a base station in a wireless communications network. It is particularly applicable, but in no way limited, for use in a cellular communications network, for transmitting and receiving signals to and from mobile stations such as mobile phones or personal data assistants.

BACKGROUND

The term "wireless communications network" is used herein to refer to a communications network comprising at least one base station transceiver arranged to communicate with at least one mobile station. It will be appreciated by those skilled in the art that a wireless communications network will often take the form of a cellular communications network, in which a plurality of base station transceivers each define a geographical cell. Mobile stations located in the communications network communicate with one or more base station transceivers, for example, the closest one to the mobile station. Each base station transceiver has a limited range and a cell can be considered to be a geographical region over which a base station transceiver can communicate effectively with a mobile station therein.

Mobile stations such as mobile telephones may be located within a cellular communications network to send and receive signals to and from the base station transceivers. Each mobile station operating within a cell requires a certain amount of bandwidth to operate and because the total bandwidth of base station transceivers is limited the number of mobile stations which can operate within a cell is limited.

The provision of base stations is expensive. Firstly, the location and surveying of suitable sites for base stations is time consuming and complex since the location of any one base station impacts the base station requirements for adjacent cells. Furthermore, obtaining planning or zoning permission for base stations is becoming increasingly difficult as a result not least of concerns about electromagnetic emissions and the aesthetic impact of antenna towers.

Accordingly, there is a general desire to minimise the number of base stations. This may be achieved by improving the coverage of base stations i.e. the geographical area over which sufficient radiated powers are produced to allow effective communication with mobile stations and/or increases in capacity i.e. the number of mobile stations which may be supported by a single base station. Assuming that these aims may be met without a disproportionate increase in base station costs, it is generally understood that a reduction in the number of base stations is desirable.

One traditional approach to this problem has been to increase "sectorisation" at the base, i.e. to use a single base station location to provide coverage in different "sectors" which are arranged radially around the base station location.

Many existing systems use "tri-sectoring" in which three sectors are covered using a single base station. The prior art tri-sectoring arrangement increases both uplink and downlink capacity by a factor of almost three compared to a basic omni-directional arrangement. However, the improvement is less than three times since perfect sectorisation is not possible i.e. there is always some overlap between adjacent sectors. This loss is called partition loss and typically increases with the number of sectors at the base. Using multibeam technology to replace each sector with an array, allows beams to be formed which are narrower than the full sector width. This has a similar effect to increased sectorisation and thus improves capacity. These arrays may for example comprise a plurality of columns of antenna elements which may or may not be combined using a beam former to produce a lesser or equal number of beams by combining the outputs of the columns, for example using a Butler matrix. For N columns there can be up to (and including) N orthogonal beams.

Typically each such sector uses an antenna having a plurality of elements which provide a plurality of beams. Typically three fixed beams are used both for uplink and downlink connections in each sector. Thus in the prior art, an antenna may be used to provide three sector coverage with three beams in each of these sectors. Using an array for each sector, narrower beams may be used which may be directed when the antenna is configured, to different parts of the sector. Since the beams typically overlap, additional information is available on the uplink which may be used using conventional space-time signal processing techniques, to provide additional spatial processing gain in the uplink.

These steps have gone some way towards providing increased capacity in base stations. Nevertheless, it is anticipated that capacity requirements will increase three or four fold from present day levels within a short space of time. This capacity requirement cannot be met with a three or four fold increase in the number of base station sites for at least the reasons explained above. Thus yet further improvements to base station capacities are required.

U.S. Pat. No. 6,480,524 describes a six column array for the downlink using a three way beam former which gives good capacity benefits. Whilst it would be possible to produce three beams from a three column array, the use of a six column array allows more control of the beam shape. By shaping the beams with "deep cusps" (by using multiple elements for each beam) overlap between the beams is reduced which in turn reduces "partition loss". This partition loss is characterised in part by interference between adjacent beams directed to different mobile stations within a sector and also by increased hand-off overhead as mobile stations hand-off back and forth between overlapped beams. Thus in the case of the downlink, there are significant advantages in reducing overlap, as explained in U.S. Pat. No. 6,480,524.

In terms of apparatus size, for the downlink it would be possible to use a six column array at the top of the mast, and maximum downlink capacity would be achieved by forming six beams with this array. However, each downlink beam would require an expensive power amplifier, together with cabling up the mast. As mentioned above, using fewer beams than columns also provides improved beam shapes. Thus, a good cost/capacity tradeoff for the downlink is a 6 column array with 3 deep cusp beams.

A further consideration in base station design is the possibility of using the same antenna array both for the uplink and downlink. The use of separate arrays requires larger areas of land and also generally has increased aesthetic impact. Where the arrays are mounted on the same structure, additional arrays also produce increased wind loading problems. Thus it is generally desirable to attempt to use the same array i.e. a common array, both for the uplink and downlink communications. However, this may place compromises on the design of the uplink antenna which typically is configured (i.e. constructed and fed) identically to that of the downlink.

Thus in practice, the capacity of a state-of-the-art base station is asymmetric i.e. greater downlink capacity is available than uplink capacity. Whilst this may be suitable for some data applications such as web-browsing or streaming video, it is unsuitable for applications such as voice communications.

SUMMARY

According to a first aspect of the invention there is provided an antenna array suitable for use in a base station in a wireless communications network, the antenna array having a first beamforming arrangement for producing uplink beams and a second beamforming arrangement for producing downlink beams, wherein the first and second beamforming arrangements are different from one another. The use of two beamforming arrangements provides the advantage that the number and shape of beams on the uplink and downlink can be independently designed to suit their differing requirements, resulting from different cost/capacity tradeoffs.

This array takes advantage of the different technical considerations for the uplink as compared to the downlink. Thus for example in the six column array described in U.S. Pat. No. 6,480,524, all six columns may be used as separate uplink receiver branches. In general, a large number of separate antenna elements for the uplink is desirable since this improves the space combiner gain and this being the case, beam overlap problems are less significant than in the downlink. Furthermore, the cost implications of multiple antenna elements is different. Power amplifiers for the downlink are considerably more expensive than low noise amplifiers required for the uplink and thus as explained in more detail below, the cost and cabling trade-offs for the uplink are different to those for the downlink. It has been found that the increased costs of using a separate beam forming arrangement for the uplink are more than outweighed by the improvements in uplink capacity for the base station.

Preferably the first and second beamforming arrangements feed a common antenna array to produce the uplink and downlink beams. A common array is an array which is used for both transmitting and receiving signals. Using a common antenna array provides the advantage that separate antenna arrays for the uplink and downlink are not required.

Preferably a plurality of (sin x/x) beams are formed for the uplink, and a plurality of low cusp beams are formed for the downlink. Preferably these beams are dual polar, and thus the antenna may advantageously be arranged to achieve diversity gain from the dual polar beams in both the downlink (transmit diversity) and uplink (receive diversity) directions.

In a preferred embodiment, the antenna array is arranged such that three dual polar low cusp beams are formed for the downlink, and six dual polar (sin x/x) beams are formed for the uplink.

The antenna array may have a six column arrangement in which the six antenna column outputs are fed directly to the receiver equipment for combination, rather than being combined at the masthead in a beamformer to give beams.

The number of uplink beams produced by the first beamforming arrangement may be twice as many as the number of downlink beams produced by the second beamforming arrangement. This enables the uplink capacity to be enhanced by a factor of approximately 2 times, without impacting the downlink performance, whilst still using a common array.

In one preferred embodiment, the number of uplink beams is four and the number of downlink beams is two. In another preferred embodiment, the number of uplink beams is six and the number of downlink beams is three.

The second beamforming arrangement may be configured to transmit multiple input multiple output (MIMO) transmissions. The first beamforming arrangement may also in principle be configured to receive MIMO transmissions.

Preferably the antenna array comprises a three beam downlink, a six beam uplink, and a plurality of circulators. Alternatively the antenna array may comprise a three beam downlink, a six beam uplink, and a plurality of filters to separate the uplink and downlink signals, the filters being arranged to discriminate on the basis of frequency. A second alternative for time domain duplexed systems (as currently deployed for Wireless LAN or UMTS in time domain duplex mode) would use multiple switches to separate the uplink and downlink signals The uplink arrangement may use maximal ratio combining or minimum mean squared error combining.

A separate pilot may be used on each of the downlink beams. On the uplink, individual pilot signals are typically transmitted by each mobile station.

According to a second aspect of the invention there is provided a masthead of a base station transceiver including an antenna array having a first beamforming arrangement for producing uplink beams and a second beamforming arrangement for producing downlink beams, wherein the first and second beamforming arrangements are different from one another.

According to a third aspect of the invention there is provided a cellular communications network including an antenna array having a first beamforming arrangement for producing uplink beams and a second beamforming arrangement for producing downlink beams, wherein the first and second beamforming arrangements are different from one another.

According to a fourth aspect of the invention there is provided a cellular communications network comprising a plurality of cells, wherein a plurality of said cells each contains a base station transceiver having a first beamforming arrangement for producing uplink beams and a second beamforming arrangement for producing downlink beams, wherein the first and second beamforming arrangements are different from one another.

For each base station transceiver, preferably the first and second beamforming arrangements feed a common antenna array to produce the uplink and downlink beams.

Preferably a plurality of (sin x/x) beams are formed for the uplink, and a plurality of low cusp beams are formed for the downlink. Preferably these beams are dual polar.

Particularly preferably each antenna array is arranged such that three dual polar low cusp beams are formed for the downlink, and six dual polar (sin x/x) beams are formed for the uplink.

According to a fifth aspect of the invention there is provided a base station transceiver for use in a wireless communications network, the base station transceiver having an antenna array, the antenna array having a first beamforming arrangement for producing uplink beams and a second beamforming arrangement for producing downlink beams, wherein the first and second beamforming arrangements are different from one another.

Preferably the first and second beamforming arrangements feed a common antenna array to produce the uplink and downlink beams.

Preferably a plurality of (sin x/x) beams are formed for the uplink, and a plurality of low cusp beams are formed for the downlink. Preferably these beams are dual polar.

Particularly preferably the antenna array is arranged such that three dual polar low cusp beams are formed for the downlink, and six dual polar (sin x/x) beams are formed for the uplink.

According to a sixth aspect of the invention there is provided a radio signal received on a plurality of (sin x/x) beams forming an uplink of a cellular communications network.

According to a seventh aspect of the invention there is provided an antenna array suitable for use in a base station in a wireless communications network, the antenna array having a plurality of antenna elements of which at least some are combined to form a beam for transmitting downlink signals and at least some are used to form a beam for receiving uplink signals, wherein the uplink and downlink beamforming arrangements are different from one another.

According to an eighth aspect of the invention there is provided a method of operating a wireless communications network, comprising using an antenna array having a first beamforming arrangement to produce uplink beams and a second beamforming arrangement to produce downlink beams, wherein the first and second beamforming arrangements are different from one another.

Preferably the method further comprises using a common antenna array to produce the uplink and downlink beams.

Preferably the method further comprises forming a plurality of (sin x/x) beams for the uplink, and a plurality of low cusp beams for the downlink.

In a preferred embodiment the method further comprises forming three dual polar low cusp beams for the downlink, and six dual polar (sin x/x) beams for the uplink.

Preferably the method comprises combining at least some of the antenna elements to form a beam for transmitting downlink signals and using at least some of the antenna elements to form a beam for receiving uplink signals, wherein the uplink and downlink beamforming arrangements are different from one another.

Preferably the wireless communications network is a cellular wireless communications network.

Other aspects and features of the present invention will become apparent to those ordinarily skilled in the art upon review of the following description of specific embodiments of the invention in conjunction with the accompanying figures.

DETAILED DESCRIPTION

Figure 1:
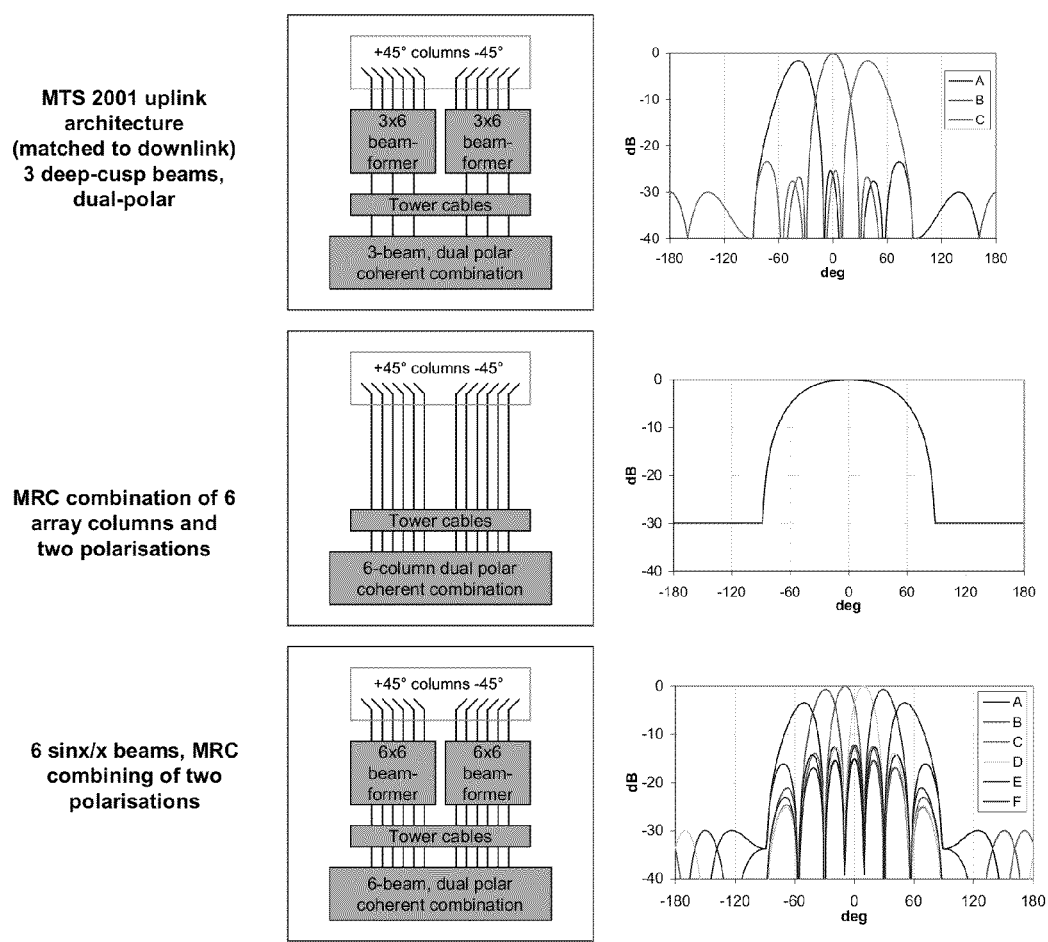
FIG. 1 illustrates uplink array processing options, associated implementation architecture, and antenna patterns as used in the simulations.

The problem of how to enhance the uplink capacity of a base station, without the need to use separate antenna arrays for the uplink and downlink, has been addressed by developing an antenna array having a first beamforming arrangement for the uplink in which preferably a plurality of (sin x/x) beams are formed, and a second beamforming arrangement for the downlink in which preferably a plurality of low cusp beams are formed. The two beamforming arrangements use a common antenna array. This approach is described in detail below.

A key issue is to determine whether an uplink architecture to support the 6-column combining (or 6-beam) options is viable, due to the increased complexity. This has not been considered before and goes against accepted practice. It has been concluded, as explained below, that such an architecture can be implemented for the uplink, and that it is possible for the uplink and downlink architectures to differ.

The analysis and simulation results which follow indicate better performance for a 6-beam uplink than for a 6-column combining scheme, although in principle the best possible performance should be similar as it is possible for the 6-column combination to apply the same transform as the 6×6 beamformer, thereby generating the (sin x/x) beams digitally. The preferred solution in terms of uplink capacity is therefore to include a 6×6 uplink beamformer at the masthead, either with or without an active masthead, depending on the coverage requirements.

As a way of increasing the uplink sensitivity, architectures in which all six of the antenna array columns are combined coherently appear feasible. This does increase the total cost of the cell-site but becomes a viable option if the additional array processing also provides an increase in capacity, such that the total cost per area for a network deployment is reduced. This can be achieved either by combining all 12 antenna columns within a sector (i.e. six array columns from 2 polarisations) using digital Maximal Ratio Combination (MRC) or minimum mean squared error (MMSE) combining in the Node B cabinet, or alternatively by forming six fixed polarisation diverse beams within each sector. In both of these approaches, there are consequently 36 cables per cell-site, as opposed to 18 cables if the uplink antenna configuration was identical to the downlink. This raises issues relating to the weights of feeder cables and the weights of any masthead electronics. For such an uplink architecture, the total weight per channel should be minimised, such that the increased gain due to array processing is not negated by the need to use very low weight (and high loss) feeder cables.

In considering the use of array processing to enhance the uplink, it is important to understand the capacity and link budget implications of the different beamforming and maximal ratio combining (MRC) options. Simulations have been conducted for asynchronous code divisional multiple access (A-CDMA) and synchronous code divisional multiple access (S-CDMA) networks, modelling the capacity available for systems with either a 3-beam uplink, 6-column MRC, or a 6-beam uplink. Our results for A-CDMA networks predict an extra 2× capacity increase for either 6-column MRC or 6 sin x/x beams, relative to a system with 3 deep-cusp beams.

(These configurations therefore give 6× capacity gain relative to baseline tri-cellular.) The antenna patterns as used in the simulations, and associated implementation architecture, are shown schematically in FIG. 1.

Similarly, it can be argued that there is an additional link budget gain available using 6-column MRC, or 6×6 beamformer, relative to the 3-beam architecture. We suggest a 6.8 dB array processing gain for 6-column MRC relative to 3.8 dB for the 3-beam architecture (assuming that the 3 beams are also MRC combined, providing additional gain for the user equipment (UE) at azimuths which fall in the deep cusps of the beam pattern). There is then a 3 dB gain for the 6-column or the 6-beam architecture relative to the 3-beam architecture.

Then it is important to demonstrate that the capacity benefits and the link budget benefits are available in combination, as opposed to providing either a capacity or a link budget gain. This has been approached via consideration of CDMA capacity equations as an aid to interpreting the results of the capacity simulations. These capacity equations have also been used to compare the network capacities of different options, but the aim of this is to interpret the simulations which use representative path loss models and beam patterns and so are ultimately more accurate than the simple capacity predictions. It should be noted however that the simulations do not include a representation of a maximum UE transmit power.

Figure 2:
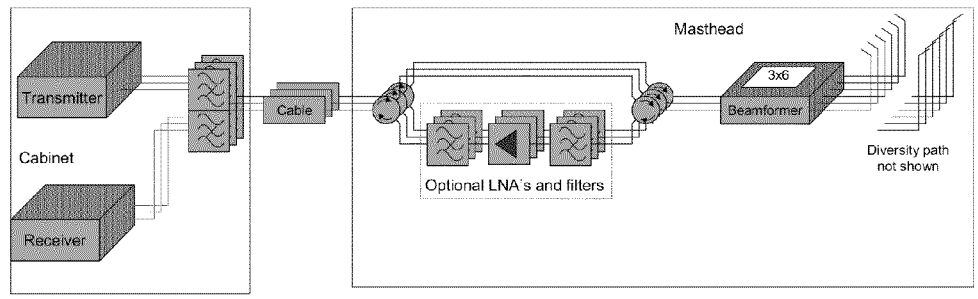
FIG. 2 illustrates a 3-beam downlink/3-beam uplink architecture.
Figure 3:
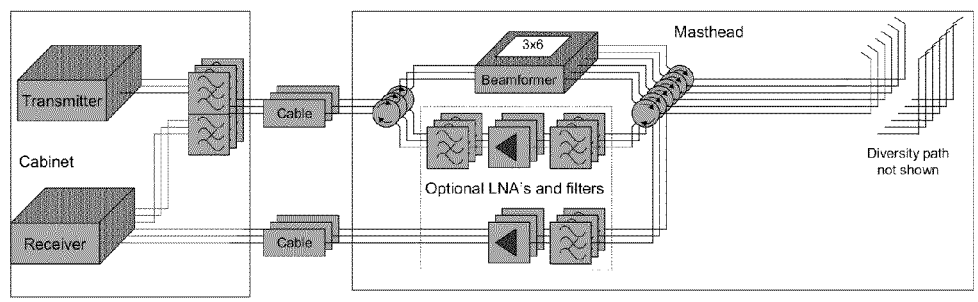
FIG. 3 illustrates a 3-beam downlink/6-column uplink architecture.
Figure 4:
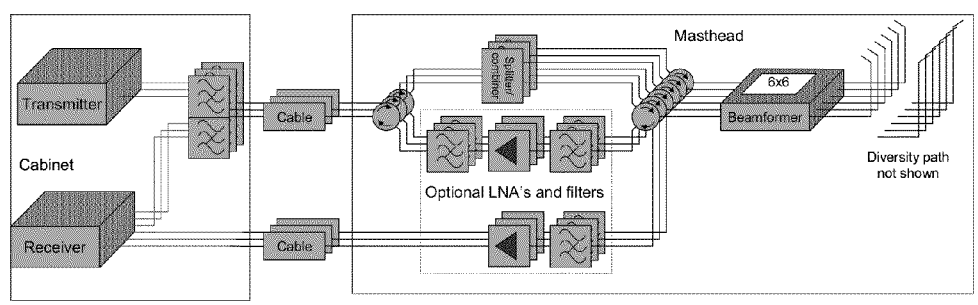
FIG. 4 illustrates a 3-beam downlink/6-beam uplink architecture.

The following discussion presents a more detailed review of four viable architecture options, these being:
- 3 beam, no active masthead electronics
- 3 beam, with masthead LNA's and filters
- 6 column combining, no active masthead electronics
- 6 column combining, with masthead LNA's and filters These are illustrated in FIGS. 2 and 3, with FIG. 4 showing the 6 beam variants.

This capacity and link budget analysis takes a basic CDMA capacity equation and extends it to include the additional array processing factors. The network capacity is compared for a common 'operating point' which corresponds to a common proportion of the system 'pole capacity' where this 'pole' is reached asymptotically as the system becomes interference limited (i.e. interference to noise ratio tends to infinity) and the number of users in the system reaches a maximum.

The A-CDMA capacity results are compared for a common 'noise rise', i.e. the rise in noise plus user signal power, as measured at a single antenna column output. In this case, the interference consists of the combined power from each of the users within the sector or beam. In terms of a link budget for a particular user, the noise rise metric includes the power of this 'wanted' user.

For an S-CDMA system, the capacity is not only dependent on the noise rise, representing the amount of power from other users, but also on the degree to which this power is orthogonal to the wanted user (due to the use of orthogonal CDMA codes and also to dispersion). A 'coverage loss' metric is proposed, being a measure of the increase in power for each user at the receiver, required in order to overcome noise and interference from other users. This depends on both the number of other users and the extent to which their power is orthogonal. For the capacity predictions included here, capacity figures are compared on the basis of a 3 dB coverage loss, i.e. for a network in which the received power from a wanted user is 3 dB higher than it would be if it were the only user in the network.

The capacity for an A-CDMA network is defined as follows, relative to the signal to noise plus interference ratio required at the received for a user:

$$R = \left(\frac{E_b}{I_0 + N_0}\right) \cdot \left(\frac{r_b}{B}\right)$$

where:
- R is the signal to noise plus interference ratio required per user (following beam and MRC gain);
- $r_b$ is the information rate; and
- B is the CDMA chip rate (assumed to be the receiver bandwidth).

The link budget impact can be defined by the comparing the required power per user relative to thermal noise:

$$\frac{P_k}{N} = \frac{LR}{bm}$$

where:
- $P_k$ is the received power from each user in the sector;
- N is the thermal noise level at the receiver;
- b is the number of beams per sector;
- m is the number of channels per beam combined in MRC; and
- L is the coverage loss relative to a user in noise only (i.e. no interference from other users).

So, for the case with a 3-beam polarisation diversity uplink, m=2 and b=3. Similarly for the 6-column polarisation diversity uplink, m=12 and b=1. For the 6-beam polarisation diversity uplink, m=2 and b=6. This makes a simple assumption that, if a sector is divided into beams, there is a flat-topped beam pattern with gain (relative to the sector-wide pattern) equal to the number of beams. Interference from adjacent sectors or beams is assumed to be included together with the other-cell interference.

The number of users per sector is then:

$$k_A = b \frac{[m(L-1) + LR]}{[LR(1+\alpha)]}$$

where:
- $k_A$ is the number of users per A-CDMA sector; and
- a is the relative power of other-cell interference relative to intra-cell interference (see below).

For an S-CDMA network, the link budget impact is specified as above. The capacity equation assumes that there are a number of non-interfering users within the cell that use the same outer spreading code but different Walsh codes. If the number of users per sector is greater than the number of Walsh codes, these users will be assigned a different outer spreading code and so will cause interference to the wanted user. There is therefore a breakpoint in the capacity equation when the number of users per sector equals the number of available Walsh codes multiplied by the number of beams. This number of available Walsh codes is equal to the processing gain ($B/r_b$) for data links in which a single Walsh code is used per UE uplink.

The capacity is then given by:

$$\text{For } L < L_B \quad k_S = b\frac{[m(L-1) + LR\beta]}{[LR(\beta + \alpha)]}$$

$$\text{For } L \geq L_B \quad k_S = b\frac{[m(L-1) + LR(\beta + s - \beta s)]}{[LR(1 + \alpha)]}$$

And breakpoint $L_B$, corresponding to the case when $k=s*b$ $$L_B = \frac{m}{[m - R(\beta(s-1) + \alpha s)]}$$

where:
- $k_s$ is the number of users per S-CDMA sector;
- $\beta$ is the orthogonality factor; and
- s is the number of Walsh codes available.

Taking the S-CDMA case with s=1, it can be verified that the S-CDMA capacity equation reduces to become the A-CDMA case. This also occurs if orthogonality is lost due to dispersion, i.e. if $\beta=1$.

In order to represent other-cell interference, the factor $\alpha$ included above has been defined by calibrating these capacity estimates against simulation results for the single-sector case with MSNIR combination. The resulting other-cell interference ratio ($\alpha=0.45$) has then been used in predicting capacity values for other configurations and/or the S-CDMA cases. This parameter corresponds to a 'geometry factor' of 0.65. For the 6-beam architecture, the increased beam sidelobes has been represented by a value of $\alpha=0.63$.

For S-CDMA, the orthogonality factor has been assumed to be $\beta=0.5$. This implies that, for users with nominally orthogonal Walsh codes, a factor of 0.5× the received power is also included as interference the wanted user.

Capacity and link budget results are presented here for $E_b/(N_0+I_0)=2$ dB. This represents a 960 kbps data link with a processing gain of 6 dB where B=3.84 Mcps, and provides up to 4 Walsh codes available for use with a common outer spreading code. The variation of capacity with coverage loss for both asynchronous and synchronous systems is shown in FIG. 5.

Figure 5:
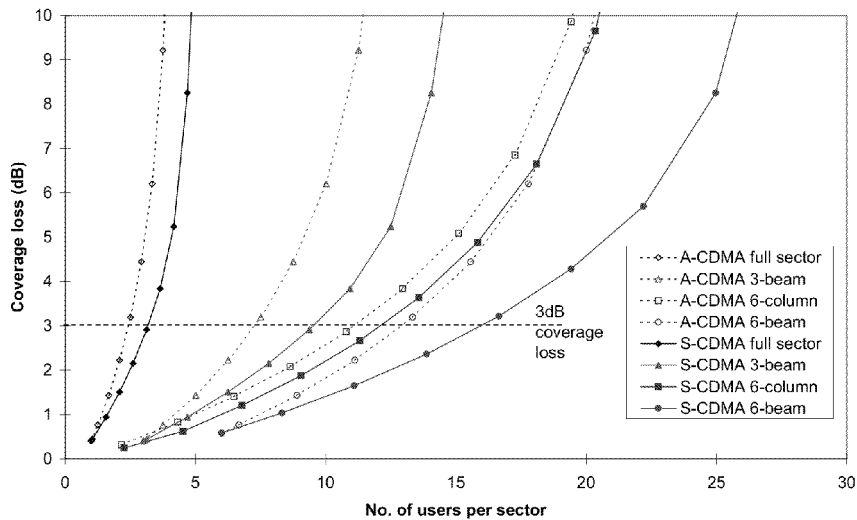
FIG. 5 is a plot of simulated CDMA coverage loss vs. capacity for different uplink architectures.

FIG. 5 shows that, for a nominal coverage loss of 3 dB, 6-beam S-CDMA enables the greatest number of users per sector (i.e. the greatest capacity). The next greatest capacity is obtained using 6-beam A-CDMA, followed (in order of decreasing capacity) by 6-column S-CDMA, 6-column A-CDMA, 3-beam S-CDMA, 3-beam A-CDMA, full sector S-CDMA and finally full sector A-CDMA.

The link budget and capacity benefits can be summarised for a 3 dB coverage loss as follows:

| Option | Link budget | A-CDMA capacity | | S-CDMA capacity | |
|---|---|---|---|---|---|
| 3-beam, dual-polar | 0 dB (ref) | 7.3 users/sector | ×1 (ref) | 9.5 users/sector | ×1.3 |
| 6-column, dual-polar | +3 dB | 11.1 users/sector | ×1.5 | 12.2 users/sector | ×1.7 |
| 6-beam, dual-polar | +3 dB | 13.0 users/sector | ×1.8 | 16.0 users/sector | ×2.2 |

This suggests that the 6-column dual-polar uplink provides a significant capacity increase over a 3-beam architecture. The 6-beam approach uses an alternative combination of the array columns and, from this analysis, gives a higher capacity.

Simplistically, the 6-beam scheme would provide 2× capacity relative to a 3-beam scheme, but some of this additional gain is lost due to the higher sidelobes of the sin x/x beams as opposed to the deep cusps in the 3-beam pattern. The 6-column scheme provides a lower capacity gain than the 6-beam scheme as users see interference from all of the users within a sector, rather than just those within the same beam. For S-CDMA, the 6-column scheme gains less from the use of orthogonal codes, relative to the beamforming schemes, as the capacity equations above assume that the Walsh code set can be used only once per sector, as opposed to once per beam.

The results above can be compared with A-CDMA simulation results. For a 3 dB noise rise, these results would be as follows:

| Option | A-CDMA capacity for 3 dB noise rise (max SNIR combining) | Normalised capacity gain |
|---|---|---|
| 3-beam, dual-polar | 6.0 users/sector | ×1.0 (ref.) |
| 6-column, dual-polar | 11.7 users/sector | ×1.9 |
| 6-beam, dual-polar | 12.1 users/sector | ×2.0 |

These results are based on full system simulation using appropriate beam patterns and representative distributions of UE's within a network layout. In terms of capacity, the simulations can be considered to be more accurate than the results of the analysis presented here, but the analysis indicates that there is also a link budget gain available and that this is provided together with the capacity benefit.

Figure 7:
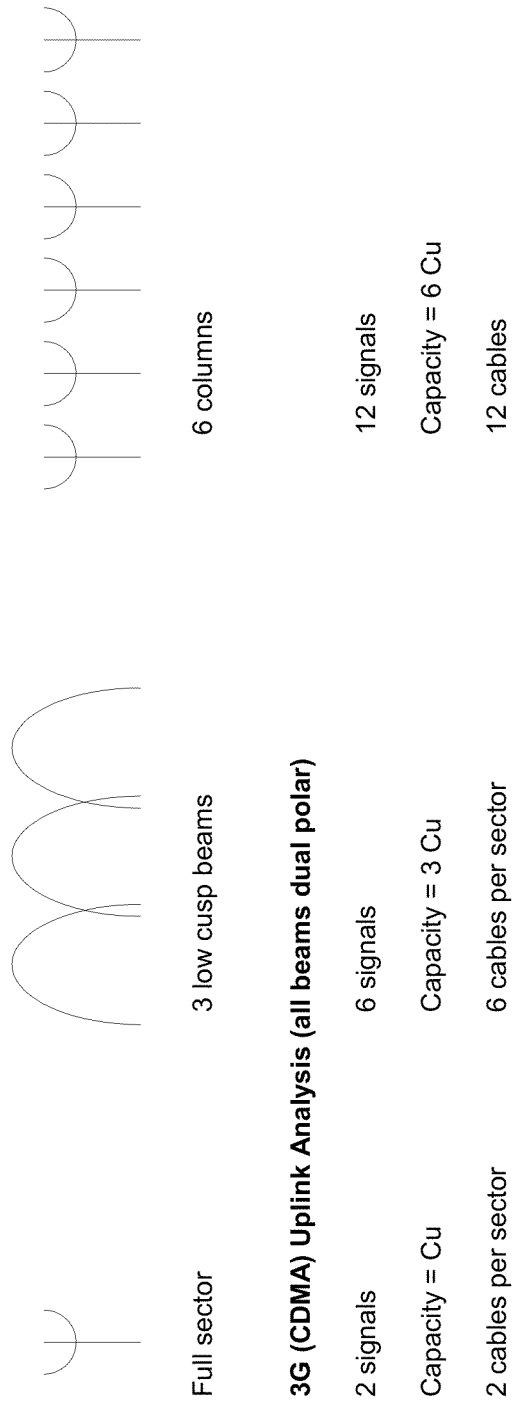
FIG. 7 illustrates comparisons between a full sector antenna, a three low cusp beam arrangement, and a six column arrangement.

Further comparisons between a full sector antenna, a three low cusp beam arrangement, and a six column arrangement are illustrated in FIG. 7.

As described above, the capacity and link budget benefits of a 6-column MRC or 6-beam uplink were summarised. Cost is also a key concern for the future system architectures. Techniques which allow the network cost to be minimised are therefore of great interest. This may be achieved through reducing the cost of each Node B site, but also by providing increased range, such that the overall number of Node B installations is reduced. Solutions providing a greater capacity or coverage per sector are therefore likely to be more cost effective.

Masthead weight is one of the key constraints. It has been assumed here that the total masthead weight (including feeder cables, masthead electronics and any additional antenna weight) cannot be increased beyond the weight of an existing tri-sector receive-diversity cell-site. This allows for the weight of 6 cables which are assumed to be up to 1⅝" diameter. The Andrew Corporation Heliax LDF series cable products have been used here as a reference, following a comparison with other cable vendors which showed these to be typical of cable insertion loss vs. weight characteristics.

Potentially, a greater weight could be allowed for a future system architecture if it were to replace multiple legacy systems. The aspect is not considered in detail here as it implies multiplexing between operators or frequency bands and therefore would involve additional hardware. However, the use of shared infrastructure or multi-band diplexers offers significant potential for reducing the overall weight of the tower installation.

Typical cell-site tower installations are rated to carry a maximum of 12⅝" diameter cables. This is consistent with the supported antenna installation of tri-sector GSM and dual-band DCS1800/UMTS each with receive diversity. This provides an indication of the upper bound to the total weight that may be permitted for a future system architecture supporting multiplexed legacy systems.

Comparing costs for a dense urban high-base environment, assuming 30 m feeder cables, there is a lower network cost for installations using the 6-beam (or 6-column) uplink scheme. There is a potential 38% improvement in cost of Node B's per uplink capacity provided. In terms of coverage, the lowest cost per unit area is given using the 6-beam uplink combined with masthead LNA's. If masthead LNA's are not included, the cost per unit area is not significantly improved over the 3-beam uplink (although there is still a capacity doubling) as the link budget benefits of the additional interference and noise reduction are negated by the higher masthead cost. It should also be noted that the masthead weight for the 6-beam uplink does not increase relative to the 3-beam design, and current estimates actually show a useful reduction. The costs here exclude the site and backhaul costs which would also tend to de-weight the increase in masthead cost over a larger coverage area.

Results for dense urban low base (20 m feeder cables) and suburban path loss model (40 m cables) are very similar. In the suburban case, the 3-beam architecture including masthead amplifiers provides the best cost per unit area ratio. The 6-beam uplink including masthead amplifiers has almost as good a cost per unit area ratio, but with the additional benefit of the capacity doubling Thus, the proposed preferred beamformer design uses a 6×6 Butler matrix followed by combiners to pair up beam ports such that three dual polar low cusp beams are formed for the downlink, and six (sin x/x) beams (also dual polar) are formed for the uplink. The appropriate rf circuitry (e.g. circulators, filters etc.—as shown, for example, in FIG. 4) are incorporated in a common array. Circulator devices typically offer a 20 dB isolation with minimal cost or weight compared to filter structures. This isolation assists in reducing filter requirements without the need for physical separation of the antenna elements. Circulators are a device which allows the downlink and uplink signals to be discriminated (based on the signal direction of propagation), such that they follow different paths at the masthead (e.g. downlink through a 3×6 beamformer and uplink through the LNA). It should be noted that circulators provide one implementation method, but any means of separating the uplink and downlink signals would be applicable. One alternative is to use filters (particularly diplexer filters) in which the discrimination is based on the use of different frequency bands for uplink and downlink signals. However, our proposed design uses circulators as one possible means of implementation without excessive weight, based on a prediction of future component capabilities.

This is an optimum arrangement for the downlink in terms of efficient use of PA's and cost per unit of capacity (as discussed in U.S. Pat. No. 6,480,524). Using six (sin x/x) beams for the downlink would be sub-optimal due to beam overlap. However, this does not impact the uplink similarly, and six (sin x/x) beams offer approximately twice the capacity of three low cusp beams for the uplink.

An efficient arrangement using circulators at the masthead has been found which allows three beam downlink and six beam uplink (for both polarisations), as shown in FIG. 4. A six column arrangement is shown in FIG. 3. More cables are required, but these may be of reduced diameter such that the total weight, wind loading and cost are maintained, and the uplink link budget is also enhanced due to the extra combining gain provided.

Figure 6:
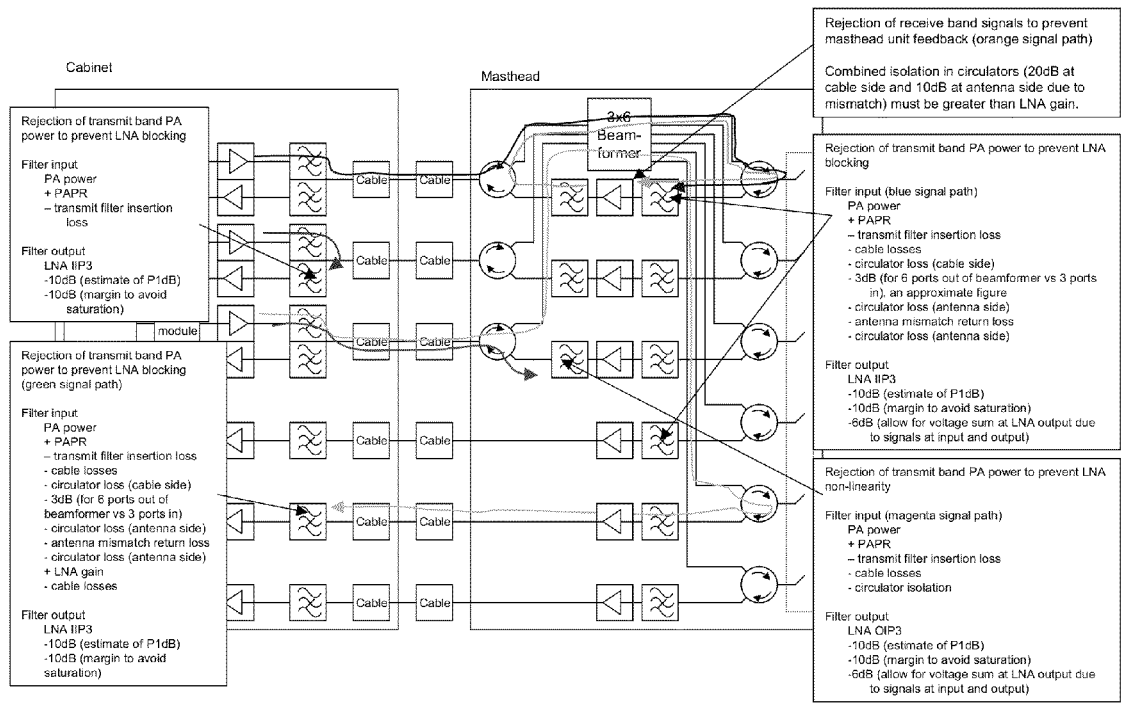
FIG. 6 shows filter specifications suitable for a 6-column/6-beam uplink with masthead LNA's.

Filter specifications suitable for the 6-column/6-beam uplink with masthead LNA's are shown in FIG. 6.

Figure 8:
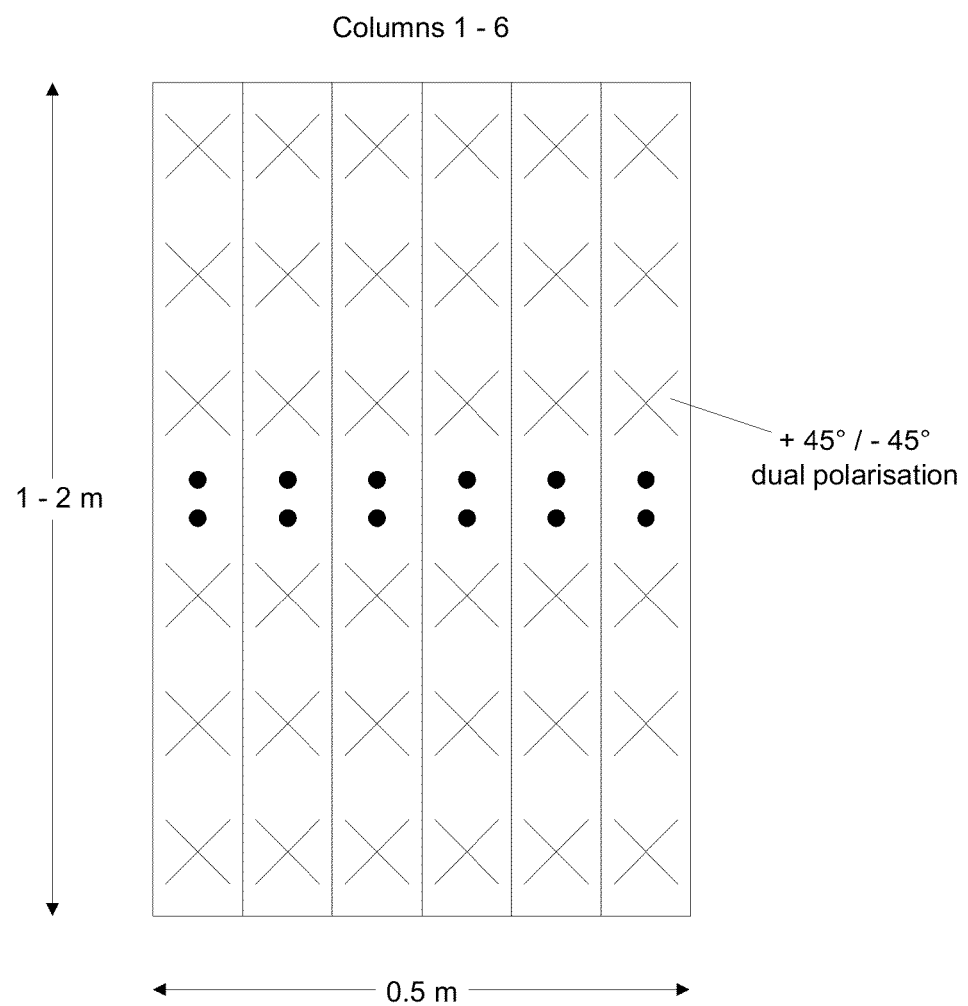
FIG. 8 illustrates an example of a suitable six column masthead antenna arrangement.

An example of a suitable six column masthead antenna arrangement is illustrated in FIG. 8. This arrangement uses +45°/−45° dual polarisation over six columns to generate 12 beams. Each X-shaped component comprises a +45° element and a −45° element. Using dual polarisation, the problems caused by Doppler effects and the effects of buildings, which give rise to fading or cancellation (as a result of signal recombination) or multipath effects, can be mitigated. The use of dual polarisation allows diversity gain to be achieved.

Further improvement may be achieved using MMSE combining rather than the MRC described above. MMSE combining provides benefit in particular when the interference distribution is spatially 'coloured' (i.e. correlated from antenna column to antenna column, or from beam to beam). If the interference were spatially 'white' (i.e. uncorrelated from antenna column to antenna column, or from beam to beam) then the MMSE combining solution would be identical to the MRC combining solution. Simulations indicate that MMSE combining typically adds some 10-25% to the uplink capacity.

In another alternative embodiment the antenna array may be arranged such that two dual polar low cusp beams are formed for the downlink, and four dual polar (sin x/x) beams are formed for the uplink, or indeed any multiples of uplink and downlink beams may be chosen according to application requirements.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions. In particular, it will be understood that the numbers of antenna elements, beams and beam patterns may vary according to application.

LIST OF ABBREVIATIONS

CDMA Code Division Multiple Access
A-CDMA Asynchronous Code Division Multiple Access
S-CDMA Synchronous Code Division Multiple Access
CEM Common Element Manager
DPCCH Dedicated Physical Control Channel
DPDCH Dedicated Physical Data Channel
LNA Low Noise Amplifier
MIMO Multiple Input Multiple Output
MMSE Minimum Mean Squared Error
MRC Maximal Ratio Combining
MSNIR Maximal Signal to Noise plus Interference Ratio
PA Power Amplifier
UE User Equipment

| List of Abbreviations | |
|---|---|
| CDMA | Code Division Multiple Access |
| A-CDMA | Asynchronous Code Division Multiple Access |
| S-CDMA | Synchronous Code Division Multiple Access |
| CEM | Common Element Manager |
| DPCCH | Dedicated Physical Control Channel |
| DPDCH | Dedicated Physical Data Channel |

| List of Abbreviations | |
|---|---|
| LNA | Low Noise Amplifier |
| MIMO | Multiple Input Multiple Output |
| MMSE | Minimum Mean Squared Error |
| MRC | Maximal Ratio Combining |
| MSNIR | Maximal Signal to Noise plus Interference Ratio |
| PA | Power Amplifier |
| UE | User Equipment |

What is claimed is:

1. A method, comprising:
  downlinking, by a user equipment of a wireless communications network, one or more signals from a transceiver, the transceiver being coupled to:
    a first beamforming arrangement configured to produce dual polar uplink beams; and
    a second beamforming arrangement configured to produce a plurality of dual polar downlink beams;
  wherein the dual polar uplink beams and the dual polar downlink beams have antenna gain that varies with direction, wherein the first and second beamforming arrangements are different from one another, wherein the dual polar uplink beams are distinguished from the dual polar downlink beams in shape, and wherein a number of dual polar uplink beams produced is greater than a number of dual polar downlink beams produced;
  processing, by the user equipment, at least one of the signals.

2. The method of claim 1, wherein three dual polar beams are formed for downlink and six dual polar beams are formed for uplink.

3. The method of claim 1, wherein a number of dual polar uplink beams produced by the first beamforming arrangement is twice a number of dual polar downlink beams produced by the second beamforming arrangement.

4. The method of claim 1, wherein a number of dual polar uplink beams produced by the first beamforming arrangement is four, and wherein a number of dual polar downlink beams produced by the second beamforming arrangement is two.

5. The method of claim 1, wherein a number of dual polar uplink beams produced by the first beamforming arrangement is six, and wherein a number of dual polar downlink beams produced by the second beamforming arrangement is three.

6. The method of claim 1, wherein at least one communication over the wireless communications network and comprising the one or more signals is a multiple input multiple output transmission.

7. The method of claim 1, wherein the first beamforming arrangement and the second beamforming arrangement are coupled to a common array of antenna elements.

8. The method of claim 1, further comprising uplinking at least one signal to the transceiver.

9. A method, comprising:
  downlinking, by a user equipment of a wireless network communications system, one or more signals from an antenna array, the antenna array comprising:
    a first beamforming arrangement for producing uplink beams having a first number of uplink beams, wherein the first beamforming arrangement is configured to produce dual polar sin x/x uplink beams; and
    a second beamforming arrangement for producing downlink beams having a second number of downlink beams different from the first number of uplink beams; and
  processing, by the user equipment, at least one signal of the one or more signals.

10. The method of claim 9, wherein the first number of uplink beams is greater than the second number of downlink beams.

11. The method of claim 9, wherein the first number of uplink beams is twice the second number of downlink beams.

12. The method of claim 9, wherein the first number of uplink beams is six and the second number of downlink beams is three.

13. The method of claim 9, wherein the second beamforming arrangement is configured to produce low cusp downlink beams.

14. The method of claim 9, wherein the second beamforming arrangement is configured to produce dual polar low cusp downlink beams.

15. The method of claim 9, wherein at least one communication over the wireless network communications system and comprising the one or more signals is a multiple input multiple output transmission.

16. The method of claim 9, wherein the first beamforming arrangement and the second beam forming arrangement are coupled to a common array of antenna elements.

17. The method of claim 9, further comprising uplinking one or more signals to the antenna array.

* * * * *

UNITED STATES PATENT AND TRADEMARK OFFICE
CERTIFICATE OF CORRECTION

| | | |
|---|---|---|
| PATENT NO. | : 8,868,095 B2 | Page 1 of 1 |
| APPLICATION NO. | : 13/780393 | |
| DATED | : October 21, 2014 | |
| INVENTOR(S) | : Martin Stevens Smith et al. | |

It is certified that error appears in the above-identified patent and that said Letters Patent is hereby corrected as shown below:

Title Page

Item (71) Applicant: Please delete "Apple, Inc." and substitute -- Apple Inc. --

Signed and Sealed this

Seventeenth Day of February, 2015

Michelle K. Lee
*Deputy Director of the United States Patent and Trademark Office*